US009040650B2

(12) United States Patent
Caillol et al.

(10) Patent No.: US 9,040,650 B2
(45) Date of Patent: May 26, 2015

(54) RESINS OF THE PHENOPLAST TYPE OBTAINED FROM PHENOLIC COMPOUNDS AND FROM MACROMOLECULAR HARDENERS BEARING ALDEHYDE FUNCTIONS

(75) Inventors: Sylvain Caillol, Montpellier (FR); Bernard Boutevin, Montpellier (FR); Ghislain David, Montpellier (FR); Carine Burguiere, Castries (FR)

(73) Assignees: CENTRE NATIONAL DE LA RECHERCHE SCIENTIFIQUE (C.N.R.S), Paris (FR); UNIVERSITE MONTPELLIER 2 SCIENCES ET TECHNIQUES, Montpellier (FR); ECOLE NATIONALE SUPERIEURE DE CHIMIE DE MONTPELLIER, Montpellier (FR)

( * ) Notice: Subject to any disclaimer, the term of this patent is extended or adjusted under 35 U.S.C. 154(b) by 0 days.

(21) Appl. No.: 13/510,624

(22) PCT Filed: Nov. 19, 2010

(86) PCT No.: PCT/FR2010/052465
§ 371 (c)(1),
(2), (4) Date: Jul. 13, 2012

(87) PCT Pub. No.: WO2011/061456
PCT Pub. Date: May 26, 2011

(65) Prior Publication Data
US 2012/0277396 A1 Nov. 1, 2012

(30) Foreign Application Priority Data
Nov. 20, 2009 (FR) ...................... 09 05594

(51) Int. Cl.
*C08G 14/00* (2006.01)
*C08G 8/04* (2006.01)

(52) U.S. Cl.
CPC ....................... *C08G 8/04* (2013.01)

(58) Field of Classification Search
USPC ....................................... 528/146
See application file for complete search history.

(56) References Cited

U.S. PATENT DOCUMENTS

| 2,590,760 | A | | 3/1952 | Da Veiga |
| 3,117,105 | A | * | 1/1964 | Borchert ................ 528/165 |
| 3,177,163 | A | | 4/1965 | McCully |
| 3,254,038 | A | | 5/1966 | Duncan et al. |
| 3,932,334 | A | | 1/1976 | Deuzeman et al. |
| 4,045,386 | A | | 8/1977 | Hartman |
| 5,030,507 | A | | 7/1991 | Mudge et al. |
| 5,532,330 | A | | 7/1996 | Pizzi et al. |
| 6,043,350 | A | | 3/2000 | Roll et al. |
| 6,331,619 | B1 | * | 12/2001 | Besemer et al. ............ 536/105 |
| 6,426,121 | B1 | | 7/2002 | Goldstein et al. |
| 6,818,018 | B1 | * | 11/2004 | Sawhney ................ 623/11.11 |
| 7,452,442 | B2 | | 11/2008 | Pirhonen et al. |
| 8,257,832 | B2 | * | 9/2012 | Wilhelm et al. ............ 428/532 |
| 2002/0015733 | A1 | * | 2/2002 | Flashner-Barak et al. .... 424/484 |
| 2003/0164105 | A1 | * | 9/2003 | Tashiro ................ 101/453 |
| 2005/0276836 | A1 | * | 12/2005 | Wilson et al. ............ 424/422 |

FOREIGN PATENT DOCUMENTS

| EP | 0148050 A2 | 7/1985 |
| EP | 0480778 A2 | 4/1992 |
| EP | 0544927 A1 | 6/1993 |
| EP | 0639608 A1 | 2/1995 |
| EP | 0648807 A1 | 4/1995 |
| EP | 0896008 A1 | 2/1999 |
| FR | 581705 A | 12/1924 |
| GB | 972094 A | 10/1964 |
| WO | 0058843 A1 | 10/2000 |
| WO | 2007060237 A1 | 5/2007 |

OTHER PUBLICATIONS

Urquiaga et al. (Biol. Res. v.33 n.2 Santiago 2000).*
Despres et al., "Formaldehyde-Free Aminoresin Wood Adhesives Based on Dimethoxyethanal", Journal of Applied Polymer Science, vol. 110, pp. 3908-3916, 2008, Wiley Periodicals, Inc.
Pizzi et al., "The Role of Aldehydes other than formaldehyde in tannin-based wood adhesives", Journal Holzforschung und Holzverwertung, 1980, vol. 32, No. 4, pp. 101-103.
Nuyken et al., "Polymeric Dienes", Handbook of Polymer Synthesis, 2nd Edition, pp. 337-378, 2005.
Slomkowski, "Plyacrolein Containing Microspheres: Synthesis, Properties and Possible Medical Appliations", Progress in Polymer Science, 1998, vol. 23, pp. 815-874.
Mancuso et al., "Activated Dimethyl Sulfoxide: Useful Reagents for Synthesis", Synthesis, Mar. 1981, pp. 165-185.
Corey et al., "A New and Highly Effective Method for the Oxidation of Primary and Secondary Alcohols to Carbonyl Compounds", Journal of the American Chemical Society, vol. 94, No. 21, pp. 7586-7587, Oct. 18, 1972.
Anelli et al., "Fast and Selective Oxidation of Primary Alcohols to Aldehydes or to Carboxylic Acids and of Secondary Alcohols to Ketones Mediated by Oxoammonium Salts under Two-Phase Conditions", J. Org. Chem. 1987, vol. 52, No. 12, pp. 2559-2562.
Sarni-Manchado et al., "Polyphenols in Food Products", Les Polyphénols en Agroalimentaire, 2006.
Bruneton, "Pharmacognosy—Phytochemistry, Medicinal Plants", 2nd Edition, Nov. 1999.
Kolodziej, "Thiolysis of Birch Bark Procyanidins: Structural Dependence in Formation of 2,3-CIS-3,4-CIS-Flavan-4-Benzylthioethers from Procyanidins", Phytochemistry, 1990, vol. 29, No. 5, pp. 1671-1674.
Rigaud et al., "Micro Method for the Identification of Proanthocyanidin Using Thiolysis Monitored by High-Performance Liquid Chromatography", Journal of Chromatography, 1991, vol. 540, pp. 401-405.

(Continued)

*Primary Examiner* — Shane Fang
(74) *Attorney, Agent, or Firm* — Young & Thompson

(57) ABSTRACT

A method for preparing a formaldehyde-free phenolic plastic resin, includes a step of preparing a hardener via careful oxidation of a polyol and a step of reacting the hardener with phenolic compounds.

13 Claims, No Drawings

(56) References Cited

OTHER PUBLICATIONS

Guyot et al., "Reversed-Phase HPLC following Thiolysis for Quantitative Estimation and Characterization of the Four Main Classes of Phenolic Compounds in Different Tissue Zones of a French Cider Apple Variety (*Malus domestica* Var. Kerrnerrien)", Journal of Agricultural and Food Chemistry, 1998, vol. 46, pp. 1698-1705.

Kennedy et al., "Analysis of Proanthocyanidin Cleavage Products Following Acid-Catalysis in the Presence of Excess Phloroglucinol", Journal of Agricultural and Food Chemistry, 2001, vol. 49, pp. 1740-1746.

Torres et al., "Chromatographic Characterization of Proanthocyanidins After Thiolysis with Cysteamine", Chromatographia, Oct. 2001, vol. 54, pp. 523-526.

International Search Report dated Mar. 28, 2011, from corresponding PCT application.

\* cited by examiner

RESINS OF THE PHENOPLAST TYPE OBTAINED FROM PHENOLIC COMPOUNDS AND FROM MACROMOLECULAR HARDENERS BEARING ALDEHYDE FUNCTIONS

The field of the present invention is that of the use of a polymer bearing aldehyde functions as a phenol hardener in order to obtain resins of the phenoplast type. The present invention more particularly relates to the use of a polymer bearing aldehyde functions, and not to the use of formaldehyde for cross-linking phenolic compounds. The polymer bearing aldehyde functions, described in the present invention, is obtained by polymerization of acrolein or by oxidation of a polyol. The invention thus relates to a phenolic resin, intended to be used in bulk or in a sizing composition for mineral or plant fibers. This resin results from condensation, in the presence of a basic catalyst, of a polymer bearing aldehyde functions, of phenolic compounds, of amine and of urea.

The elaboration of a macromolecular compound bearing aldehyde functions has the purpose of doing without the use of molecular compounds with an aldehyde function for reducing the volatility and the toxicity of the aldehyde hardener.

Phenoplasts are thermosetting materials obtained by polycondensation of a phenol and of an aldehyde with removal of water and formation of a three-dimensional network. Phenol and formol are two base products which are by far the most commonly used. But certain substituted phenols (cresol, resorcinol, etc) may lead to particular resins. The Belgian Léo Baekeland carried out in 1907, in the United States, a systematic study of the polycondensation of phenol and of formol according to the pH and to the molar ratio of both reagents. His merit is that he modified the properties of the obtained condensate, generally designated as a resin, by adding fillers and provided the uses thereof. Thus, phenoplasts are used by many industries in the form of resins (liquids, in solution and solids), as materials to be molded, as semi-finished products or composites. The applications in the fields require good resistance to temperature, a satisfactory fire behavior as well as low emission of fumes, tend to develop, for example, those of composites in transport.

Phenolic resins are well known for their use in the preparation of binders for products based on glass fibers, such as thermal and acoustic insulators, glass fiber reinforcement mats and printed circuit boards. For example, U.S. Pat. No. 3,932,334 describes phenol-formaldehyde resols which are simultaneously water-soluble and thermosetting, as well as binder systems based on these resols to be used for binding glass fibers in order to manufacture products such as insulating mats. Typically, for preparing the binder, other components such as other resins, monomers and additives are also further added in addition to the water-soluble phenol-formaldehyde resin. Substantial proportions of nitrogen-containing resins, such as urea-formaldehyde and melamine-formaldehyde resins and/or of monomers such as urea, melamine and dicyanodiamide, which may be condensed with the phenol-formaldehyde resins, may be added. Typically, after application of the binder on the glass fibers, provision of heat volatilizes the aqueous solvent and hardens the binder.

These resins are obtained by condensation of phenol and formaldehyde, in the presence of a basic catalyst, in a formaldehyde-phenol molar ratio generally greater than 1 so as to promote the reaction between the phenol and the formaldehyde and to reduce the residual phenol content in the resin. The residual formaldehyde and phenol content in the resin remains high.

Presently one of the great challenges of chemistry is to substitute certain widespread molecules present in materials for contact with food such as bisphenol A or in the indoor atmosphere of "life boxes" (transport, residential, tertiary . . . ) such as formaldehyde.

Formaldehyde is thus an example of a substance of extreme concern appearing on the labor union list of substances which are a priority for the REACH regulation. It is mainly used for making different types of resin (urea-, phenol- and melamine-formaldehyde resin) for the wood and paper sector, in the production of plastics, of coating materials and in the textile finishing industry. It is also used as a disinfectant and preservative in many applications. The world production of formaldehyde is about 21 million tons per year. Professional exposures to formaldehyde therefore concern a wide variety of trades and industries—more than one million European workers are exposed to formaldehyde, including 200,000 in France. Formaldehyde is classified as a carcinogen of category 1 (carcinogenic for humans) by the IARC (International Agency for Research on Cancer) and remains classified as a carcinogen of category 3 with the risk phrase R40 on a European level.

As regards the requirements sheet which one wishes to obtain in order to access thermosetting resins free of formaldehyde, it is particularly demanding and notably comprises the following specification:

The sought specification would be that phenoplast resins be elaborated from hardeners free of formaldehyde either free or released during the application or the use.

Previous technical proposals, described infra, have attempted to meet some of these challenges. As an illustration, mention will be made of previous proposals first of all relating to the removal of formaldehyde, (a) to (r):

(a): Patent EP 0 148 050 describes the addition in the resin of a sufficient amount of urea which reacts with free formaldehyde by forming urea-formaldehyde condensates for reducing the amount of residual formaldehyde. The obtained resin contains phenol-formaldehyde and urea-formaldehyde condensates, has free formaldehyde and free phenol levels expressed as a total weight of liquid, of less than or equal to 3% and 0.5% respectively and has a dilutability in water at least equal to 1,000%. If the amount of residual phenol is acceptable, on the other hand the amount of residual formaldehyde is too high for meeting present regulatory constraints.

(b): In EP 0 480 778, it was proposed to substitute part of the urea with an amine which reacts with the free phenol and formaldehyde according to Mannich's reaction in order to form a condensation product having improved heat stability. The free phenol and free formaldehyde levels of this resin are less than or equal to 0.20% and less than or equal to 3%, respectively. The object of the present invention is a phenolic resin which has sufficient characteristics so as to be able to be used in a sprayable sizing composition and which has a low capacity of producing undesirable emissions, notably which has a low level of free formaldehyde and phenol and generates very little formaldehyde during its use.

(c): U.S. Pat. No. 5,030,507 describes a binder based on a copolymer without any formaldehyde prepared from an emulsion of (meth)acrylic acid, styrene, acrylonitrile or vinyl acetate and an isocyanate.

(d): U.S. Pat. No. 6,426,121 contemplates the use of a polyaldehyde hardener but in reality only describes the use of telechelic dialdehyde, glyoxal and glutaraldehyde. Now, both of these compounds are toxic or even sensitizing.

(e): U.S. Pat. No. 5,532,330 relates to a method for elaborating binders based on tannins without any formaldehyde but with silica SiO$_2$ as a coupling agent.

(f): U.S. Pat. No. 6,043,350 relates to a method for elaborating binders based on tannins and on paraformaldehyde and ammonium salts.

(g): Patent EP 0 896 008 relates to the binder composition containing fir bark and/or pecan tannins, paraformaldehyde and an ammonium salt of a weak acid. The formulations are notably used as a binder for particle panels with high resistance to transverse traction, with good resistance to water and low emission of formaldehyde.

(h): The articles of Pizzi et al.[i, ii] relate to the elaboration of resins from tannins and from substitutes of formaldehyde and in particular dimethoxyethanal, acetaldehyde or glyoxal. But the reactivity is much lower than in the use of formaldehyde and toxicity problems remain.

(i): U.S. Pat. No. 3,254,038 relates to a method for elaborating binders based on tannins, phenolic resin and alkaline metal hydroxide.

(j): Patent EP 0 544 927 relates to a method for elaborating an adhesive composition comprising an isocyanate, a phenol-formaldehyde resin and a tannin. This composition is useful for making plywood which may be used outdoors.

(k): Patent EP 0 648 807 relates to the elaboration of binders based on tannins and on "weakly acid compounds". These novel binders may be hardened at a high temperature and are compatible with cellulose materials. They are suitable for manufacturing materials derived from wood such as particle panels.

(l): Patent EP 0 639 608 relates to thermosetting binders based on tannin and on a substance which releases formaldehyde under the action of heat. They are intended for cellulose materials.

(m): U.S. Pat. No. 2,590,760 relates to the elaboration of resins based on tannin, sulfuric acid, acetone and potassium cyanide.

(n): U.S. Pat. No. 3,177,163 relates to the elaboration of resins based on wood bark containing tannins, on urea and formaldehyde.

(o): U.S. Pat. No. 4,045,386 relates to a formulation of binders based on a bark alkaline solution containing tannins and on an aldehyde.

(p): U.S. Pat. No. 7,452,442 relates to a method for elaborating binders for wood, based on an amino-melamine resin and on a phenolic resin based on tannin.

(q): Patent WO 058843 relates to a formulation of binders based on a tannin, on an amine compound (urea, monomethylol-urea or dimethylol-urea), on an aldehyde (formaldehyde, paraformaldehyde or acetaldehyde).

(r): Patent WO 2007060237 proposes conventional phenoplast formulations containing other additives (amine, phenol or resorcinol) which may block traces of free formol.

It emerges from the foregoing that the prior technical proposals described above incompletely satisfy the specification of the requirement sheet indicated supra and, in particular as regards the elaboration of thermosetting phenoplast resins without any formaldehyde. Moreover, these proposals by no means show the elaboration of phenoplast resins by means of a macromolecular hardener bearing aldehyde functions.

It also emerges from these studies that the reactivity of formol is always higher than that of all the other known molecular aldehydes (ethanal, glyoxal, dialdehydes, furfural . . . ).

In this state of things, an essential goal is to be able to provide novel solutions for elaborating thermosetting phenoplast resins without any free formaldehyde.

This goal is achieved by the present invention as regards the use of a macromolecular hardener bearing aldehyde functions in the elaboration of phenoplast resins with phenolic compounds. This macromolecular hardener bearing aldehyde functions is obtained without using formaldehyde, by polymerization of acrolein or by controlled oxidation of a polyol of natural or synthetic origin.

Quite unexpectedly, taking into account the reactivity of the aldehydes, it was found that the macromolecular hardener bearing aldehyde functions may react much faster than the other aldehydes.

The polymer bearing aldehyde functions used as a hardener for phenolic compounds may be obtained according to two routes: polymerization of acrolein or controlled oxidation of a polyol.

Acrolein may be obtained by catalytic reduction of glycerol, a natural compound derived from oleaginous biomass. Therefore, we polymerized acrolein in order to synthesize a poly(acrolein) bearing reactive aldehyde functions.

Acrolein is a highly reactive monomer which may polymerize via an anionic, cationic or radical route. The characteristics of the polymers synthesized by these different methods are highly variable. Radical polymerization exclusively mobilizes the vinyl function by 1-2 addition, whereas ionic polymerizations mainly occur by 3-4 addition on the carbonyl group. The third possibility of 1-4 addition is encountered less frequently. These sequences are summarized by Scheme 1.

Scheme 1: Different types of polymerization

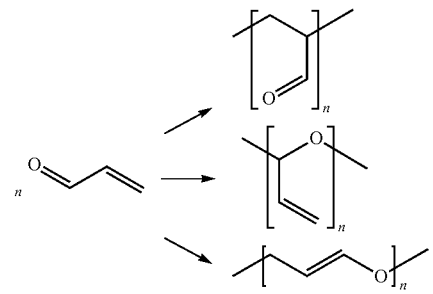

Radical Polymerization

Conventional radical polymerization of acrolein leads to a polymer having pendant aldehyde groups, which spontaneously form acetyls and hydrates by inter- and intra-molecular condensation. These polymers are infusible and insoluble in water and in organic solvents.

Ionic Polymerization

Ionic polymerization of acrolein mainly mobilizes the carbonyl function but additions on the vinyl function and on both functional groups also occur. Because of the spacing between the pendant aldehyde functions, condensation does not occur, solubility problems are not posed and the polymers, illustrated by Scheme 2, are soluble in water and in organic solvents. It should be noted that the m/n ratio may be modified, notably by acting on the reaction temperature, the polarity of the solvent or the force of the base.

Scheme 2: Sequencing of units in anionic polymerization

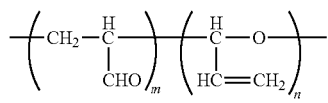

Anionic polymerization may be very simply initiated by all the initiators commonly used in anionic polymerization but it is possible to quite simply use soda in water and at room temperature[iv].

Acrolein is therefore homopolymerized by anionic polymerization in water. Polymerization is carried out in water at 0° C., initiated by a strong base such as soda. The obtained polymer remains soluble in water.

We developed a route for access to an oligomer bearing pendant aldehyde functions by controlled oxidation of an oligomer bearing alcohol functions (Scheme 3). The starting oligomer may also stem from renewable resources. Indeed, there are many routes for accessing polyols from biomass (oil, glycerol . . . ). Therefore, the question is to prepare polyols (2 to 20 hydroxy groups) and to use natural polyols and oxidize them in a controlled way in order to obtain aldehydes.

Scheme 3

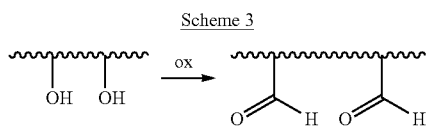

Among polyols, mention may be made of poly(allyl alcohol), poly(hydroxyl ethyl acrylate), polyethers (hydroxyethylvinylether to hydroxybutylvinylether). It is also possible to use polyethers such as α-ω-dihydroxypolyethers (polyglycerol, polyethylene glycol).

Oxidation of the polyol is carried out in water at 0° C., with an oxidizer. The obtained polymer is soluble in water and bears pendant aldehyde functions.

Controlled oxidation of primary alcohols into their corresponding carbonyl derivatives is a reaction of choice of organic synthesis, which has been the subject of most particular attention in the literature, leading to the development of many methods.

A distinction will be made notably from the most frequently used methods in the laboratory, between Swern[v] oxidation and one of its alternatives, Corey-Kim[vi] oxidation. These methods involve DMSO activated by an electrophilic reagent such as oxalyl chloride and are carried out by following a well-defined procedure taking into account the risk of explosion related to the formation of unstable reactive species during the synthesis.

In order to do without this and also to overcome the use of toxic and expensive reagents, more recent catalytic methods were developed by benefiting from the oxidizing power of nitroxide[vii] radicals such as TEMPO. In this case, oxidation most often occurs in an aqueous medium at room temperature with only 1% molar (or even less) of TEMPO, in the presence of a hypohalite (eg: NaOCl) as a co-catalyst and requires very short reaction times.

In order to elaborate resins of the phenoplast type, the hardeners bearing aldehyde functions are mixed with phenolic compounds. These phenolic compounds may be of synthetic or natural origin.

The invention also relates to the following reagents: natural phenolic compounds, which are generally sub-divided into simple phenols, acid-phenols (derivatives of benzoic or cynamic acid) and coumarins, naphthoquinones, stilbenoids (two C6 cycles bound by 2C), flavonoids, isoflavonoids and anthocyans ($C_6$-$C_3$-$C_6$ structure) and the polymerized forms:

lignans, lignins, condensed tannins and hydrolysable tannins. These base carbon backbones stem from the secondary metabolism of plants, elaborated via the shikimate route. These are molecules containing at least one benzene ring and hydroxyl groups.

| | | | Phenolic Compounds | |
|---|---|---|---|---|
| Carbon backbone | Class | Example | Formula | Origin |
| $C_6$ | Simple phenols | Hydroquinone | HO—⌬—OH | Bearberry |
| $C_6$ | Simple phenols | Resorcinol | (benzene with two OH meta) | Wood |
| $C_6$ | Simple phenols | Phloroglucinol | (benzene with three OH) | Brown algae |
| $C_6$-$C_1$ | Hydroxybenzoic acids | p-hydroxybenzoic acid | HO—⌬—COOH | Spices, strawberries |

-continued

Phenolic Compounds

| Carbon backbone | Class | Example | Formula | Origin |
|---|---|---|---|---|
| $C_6$-$C_1$ | Hydroxybenzoic acids | Gallic Acid | | Grapes |
| $C_6$-$C_3$ | Hydroxycinnamic acids | p-coumaric acid | | Tomatoes, garlic |
| | Coumarins | Umbelliferone | | Carrots, coriander |
| $C_6$-$C_4$ | Naphthoquinones | Juglone | | Nuts |
| $C_6$-$C_2$-$C_6$ | Stilbenoids | trans-resveratrol | | Grapes |
| $C_6$-$C_3$-$C_6$ | Flavonoids | Kaempferol | | Strawberries |
| | Isoflavonoids | Daidzein | | Soy beans |

-continued

Phenolic Compounds

| Carbon backbone | Class | Example | Formula | Origin |
|---|---|---|---|---|
| | Anthocyans | Delphinidol | | Cabernet-Sauvignon grapes |
| $(C_6-C_3)_2$ | Lignans | Enterodiol | | Intestinal bacteria |
| $(C_6-C_3)_n$ | Lignins | | | Wood, kernel fruit |
| $(C_6-C_3-C_6)_n$ | Condensed tannins | Procyanidin | | Apples |

-continued

| | | | Phenolic Compounds | |
|---|---|---|---|---|
| Carbon backbone | Class | Example | Formula | Origin |
| | Hydrolysable tannins | Gallotannins | 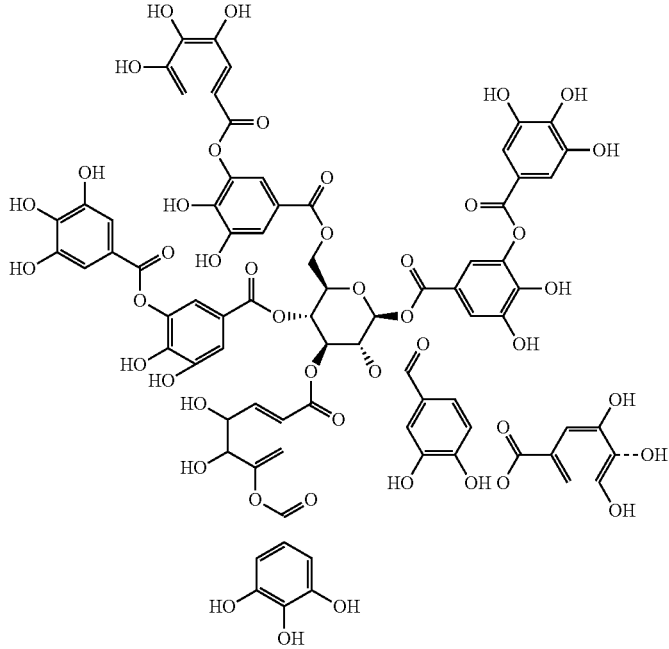 | Oak |

This table is inspired from Macheix et al. in Sarni-Manchado and Cheynier (2006)[viii], as well as from Bruneton (1999)[ix] but is not exhaustive and is not limiting for the phenols which may be used.

The polymerized forms of the phenolic compounds may be depolymerized before use. In particular, condensed tannins (or proanthocyanidins) are hot depolymerized in an alcoholic medium in the presence of an acid and of a nucleophilic reagent ([x,xi,xii,xiii,xiv]). This nucleophilic reagent reacts on the upper units and extension units, which were released as carbocations by cleavage catalyzed by an acid of interflavin bonds (Scheme 4). The nucleophilic reagent is a compound having a thiol function (such as for example toluene α-thiol, thioglycolic acid, cysteine or cysteamine) i.e. a monoaromatic phenolic compound such as phloroglucinol or resorcinol. Thus, the units making up the polymeric chains are again found, after depolymerization reaction, either in the form of free monomers when they were initially in a terminal position (lower end), or in the form of substituted monomers (thioether derivatives or derivatives of a phenolic compound) when they were initially in an intermediate position or an upper end.

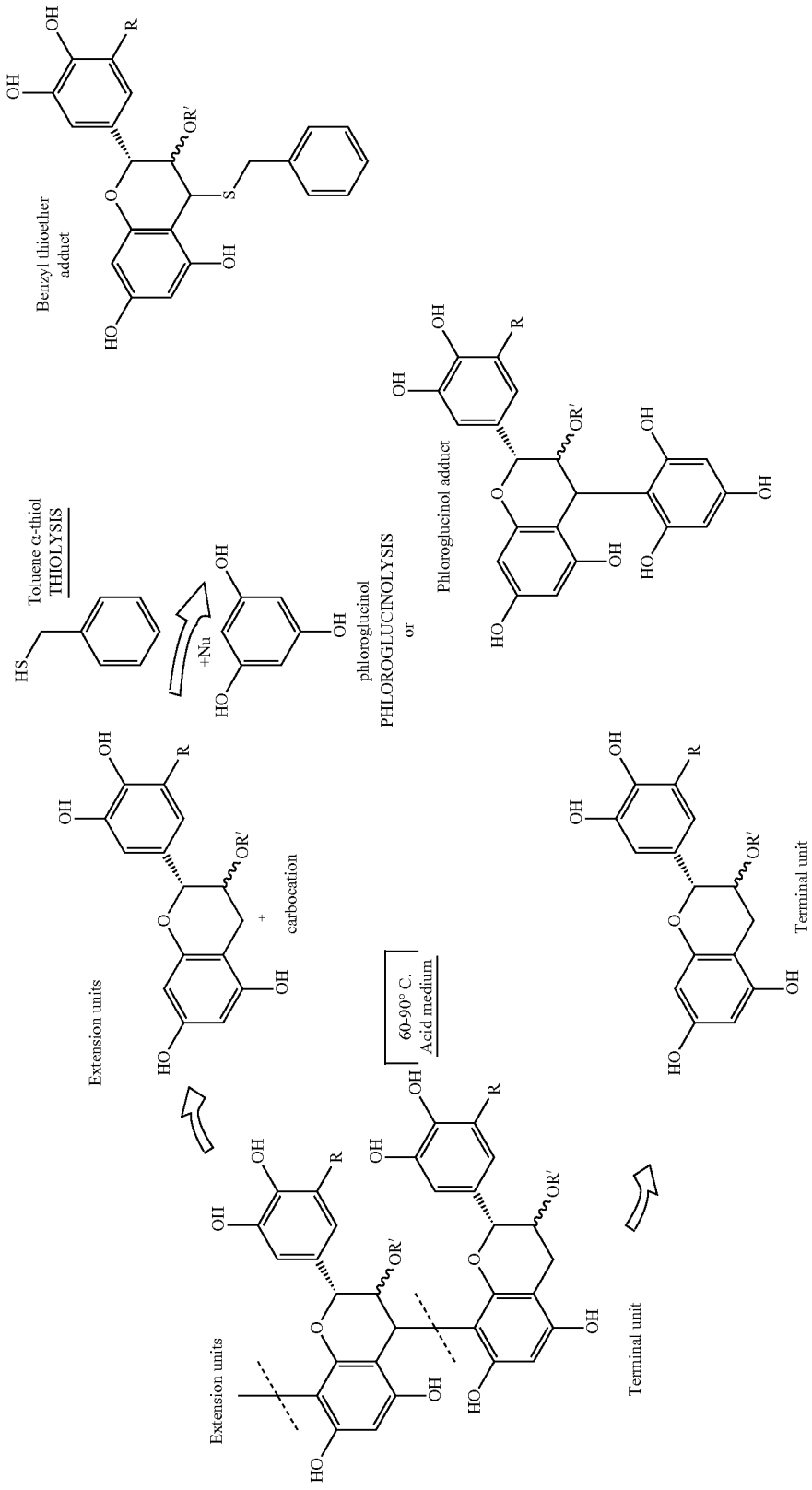

Scheme 4: Illustration of the Depolymerization Reaction of Condensed Tannins

One of the inventive foundations of these novel phenoplast resins is to use a polymer bearing reactive aldehyde functions as a hardener. The polymer corresponds to a macromolecular chain with a polymerization degree greater than two, bearing at least two aldehyde functions.

Another remarkable advantage of the selected route is that it does not use any formaldehyde.

The fact that the selected route enables hardening of natural phenolic compounds is also an innovative feature.

EXAMPLES

The following examples are used for illustrating the invention without by no means limiting the scope.

1—Synthesis of A Polymer Bearing Aldehyde Functions By Polymerization of Acrolein In a 200 mL reactor equipped with a stirring system, a condenser, a thermometer and an inlet for reagents, maintained at 0° C., 56.0 g of acrolein (1 mol) are added into 150 mL of water. 3 g of 50% soda aqueous solution are added (i.e. 0.03 mol).

The mixture is left at 0° C. with stirring for 10 hrs. The water is then evaporated and the polymer is recovered and analyzed.

Identification of the aldehyde units by $^1$H NMR spectrometry shows a CHO/C=C ratio of 1/5.

The obtained polymer was characterized by steric exclusion chromatography in tentrahydrofurane THF by using methyl polymethacrylate (PMMA) calibration. The molar masses Mn obtained are of the order of 1,700 g/mol, with a polymolecularity index Ip=2.9.

2—Synthesis of A Polymer Bearing Aldehyde Functions By Controlled Oxidation of A Polyol To a solution of the polyol (20 mmol as a primary alcohol) and of 2,2,6,6-tetramethylpiperidine-N-oxyl TEMPO (0.01 mol. equiv.) in 40 mL of dichloromethane, is added 0.1 mol. equiv. of potassium bromide dissolved in 5 mL of water. The reaction medium is then cooled to 0° C. and then 1.3 mol. equiv. of a sodium hypochlorite solution (0.35 M) buffered to pH 9 (by adding sodium hydrogen carbonate) is introduced. Stirring is maintained at 0° C. for one hour and the organic phase is then washed with water (until neutrality of the washed waters), dried on $Na_2SO_4$, filtered and dry evaporated in order to obtaining the corresponding polymer bearing aldehyde functions.

The obtained polymer was characterized by steric exclusion chromatography in THF by using PMMA calibration. The molar masses Mn obtained are of the order of 1,800 g/mol, with a polymolecularity index Ip=2.1

3—Elaboration of A Phenoplast Resin

In a 250 mL reactor equipped with a stirring system, a condenser, a thermometer and an index for reagents, 56.4 g of phenol (0.6 mol of phenol) are added to 306.0 g of polymer hardener bearing aldehyde functions from Example 1 (0.9 mol of aldehyde) in a 37% aqueous solution, in order to have a molar ratio A/P equal to 1.5.

The mixture is brought to 45° C. with stirring, and then 2.6 g of 50% soda aqueous solution (i.e. 11 moles of OH—for 100 moles of initial phenol) are regularly introduced within 30 mins while maintaining the temperature at 45° C.

The temperature is then regularly raised from 45 to 70° C. within 30 mins and is maintained at 70° C. for 80 mins, until the conversion rate of the phenol is 93%.

Next, one starts to regularly cool the mixture; diethanolamine (14.1 g i.e. 25% by weight, based on the weight of the phenol) are gradually added for the first 30 minutes. At the end of the addition of the amine, the temperature is about 60° C. During the 15 minutes which follow the end of the introduction of the amine, as the reaction is exothermic, the temperature of the reaction medium is maintained at 60° C. Next, cooling the mixture is continued. When the temperature of the reaction mixture reaches about 25° C., after about 30 mins, a 20% sulphuric acid solution is added within 60 minutes so as to reach a pH of 8.0-8.1. Urea in granules is then gradually added within 60 minutes, (121.1 g i.e. 35% by weight based on the total weight of the resin expressed as a dry extract).

The resin appears with the aspect of a limpid aqueous composition having infinite dilutability in water at 20° C. after more than 8 days. The free phenol level is 0.8%. The resin does not contain any free formaldehyde.

[i] Despres A, Pizzi A, Vu C, Pasch H; Journal of Applied Polymer Science, 2008, 110 (6), 3908-3916

[ii] Pizzi, A.; Rossouw, D. du T.; Daling, G. M. E. Holzforschung and Holzverwertung, 1980, 32 (4), 101-103

[iii] Nuyken O, Handbook of Polymer Science, 337-378

[iv] Slomkowski S., Progress in Polymer Science, 1998, 23, 815-874

[v] Mancuso, A. J., Swern, D., Synthesis, 1981, 165

[vi] Corey, E. J., Kim, C. U., J. Am. Chem. Soc., 1979, 7586

[vii] Anelli, P. L., Biffi, C., Montanari, F., Quici, S., J. Org. Chem. 1987, 52, 2559-2562

[viii] P. Sarni-Manchado, V. Cheynier, Les polyphénols en agroalimentaire, Lavoisier, Editions Tec & Doc, 2006, 398

[ix] Jean Bruneton, Pharmacognosie—Phytochimie, Plantes médicinales, Editions Tec & Doc, Editions médicales internationales, 1999, p 1120

[x] Kolodziej Phytochemistry; 1990, 29, 1671-1674

[xi] Rigaud, J.; Perez-Ilzarbe, X.; RicardodaSilva, J. M.; Cheynier, V. Journal of Chromatography; 1991, 540, 401-405

[xii] Guyot, S.; Marnet, N.; Laraba, D.; Sanoner, P.; Drilleau, J. F. Journal of Agricultural and Food Chemistry; 1998, 46, 1698-1705

[xiii] Kennedy, J.; Jones, G. P. Journal of Agricultural and Food Chemistry; 2001, 49, 1740-1746

[xiv] Torres, J.; Lozano, C. Chromatographia; 2001, 54, 523-526

The invention claimed is:

1. A method for preparing a phenoplast resin without using any formaldehyde, comprising:
preparing a macromolecular hardener bearing aldehyde functions by controlled oxidation of the primary alcohols of a polyol bearing primary alcohols, and
reacting phenolic compounds with said hardener, wherein said phenolic compounds are selected from the group consisting of acid-phenols, coumarins, naphthoquinones, stilbenoids, flavonoids, isoflavonoids, anthocyans, lignans, lignins, condensed tannins and hydrolyzable tannins.

2. The method according to claim 1, wherein the polyol is a natural polyol.

3. The method according to claim 1, wherein the polyol is a synthetic polyol.

4. The method according to claim 1, wherein the polyol has from 2 to 20 primary hydroxy groups.

5. The method according to claim 1, wherein the polyol is selected from the group consisting of poly(allyl alcohol), poly(hydroxy ethyl acrylate) and polyethers.

6. The method according to claim 1, wherein the phenolic compounds are of natural origin.

7. The method according to claim 1, wherein the controlled oxidation of the primary alcohol of the polyol is carried out in water at 0° C. and in the presence of an oxidizer.

8. The method according to claim 7, wherein the oxidizer is (2,2,6,6-tetramethylpiperidin-1-yl)oxidanyl (TEMPO), accompanied by a hypohalite.

9. A phenoplast resin obtained by the method according to claim 1.

10. The method according to claim 1, wherein the phenolic compound is selected from the group consisting of: p-hydroxybenzoic acid; gallic acid; p-coumaric acid; umbelliferone; juglone; trans-resveratrol; kaempferol; daidzein; delphinidol; enterodiol; procyanidin; and gallotannins.

11. A method for preparing a phenoplast resin without using any formaldehyde, comprising:

preparing a macromolecular hardener bearing aldehyde functions by controlled oxidation of the primary alcohols of a polyol, and reacting phenolic compounds with said hardener, wherein said phenolic compounds are selected from the group consisting of acid-phenols, coumarins, naphthoquinones, stilbenoids, flavonoids, isoflavonoids, anthocyans, and lignans.

12. A method for preparing a phenoplast resin without using any formaldehyde, comprising:

preparing a macromolecular hardener bearing aldehyde functions by controlled oxidation of the primary alcohols of a polyol, and reacting phenolic compounds with said hardener, wherein said phenolic compounds are selected from the group consisting of stilbenoids, flavonoids, and isoflavonoids.

13. The method according to claim 12, wherein the polyol is poly(hydroxyethylacrylate) that has been oxidized to contain the aldehyde functions.

* * * * *